Patented Feb. 12, 1935

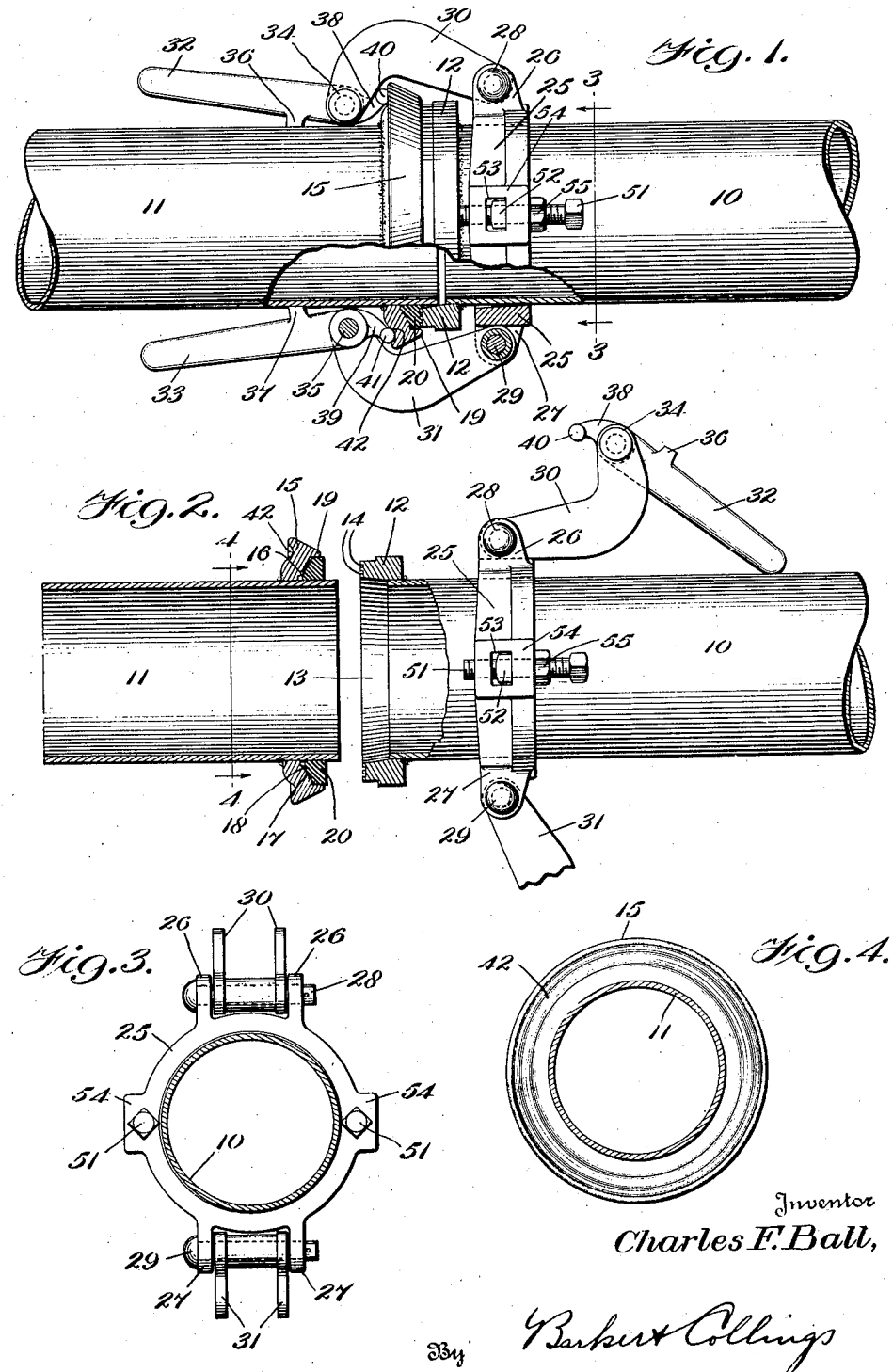

1,991,343

UNITED STATES PATENT OFFICE 1,991,343

PIPE COUPLING

Charles F. Ball, Milwaukee, Wis., assignor to Chain Belt Company, Milwaukee, Wis., a corporation of Wisconsin Application May 26, 1933, Serial No. 673,059

4 Claims. (Cl. 285—172)

This invention relates to pipe couplings for metal and other pipes, and while susceptible of employment in other fields, is primarily intended for use in connection with pipes or conduits through which concrete and/or similar plastic materials are moved by reciprocating pumps or other pressure means. The pipe lines or conduits of these concrete transporting and distributing systems must be relatively quite strong, being called upon to withstand pressures of 600 lbs. or more per sq. in., while at the same time they should be as light in weight as possible, as they are subject to considerable handling, much of which is done by manual labor under circumstances which make it impractical or impossible to employ machinery therefor. They must also be capable of easy and rapid lengthening and shortening, to shift the point of discharge as occasion requires.

To meet these requirements, the present practice is to employ thin-walled steel tubing, with a diameter of 5 inches or more, in sections approximately 10 feet in length. The ends of each section are provided with quick-detachable coupling members by means of which the sections may be quickly and easily attached to and detached from one another to increase or decrease the total length of the conduit, as circumstances require. The discharge point may thus be readily shifted from place to place, and the sections may be readily detached for individual cleaning out, which is necessary under some conditions.

The present invention has reference more particularly to such quick-detachable couplings, and has for one of its objects the provision of a coupling which will be simple in construction, comparatively inexpensive to manufacture, and which when the parts are connected will provide a joint substantially as strong as the pipe itself, and capable of withstanding relatively high pressures.

Another object of the invention is to provide a pressure-tight seal or gasket in connection with the quick-detachable coupling elements which will remain pressure tight and effective for long periods under such pressures and operating conditions as are commonly encountered in concrete pumping systems.

A further object of the invention is to provide quick-acting locking and unlocking means capable of locking operation in any radial plane, through the use of a loose collar connection which is rotatable upon the pipe section when unlocked, whereby the locking arms may be moved circumferentially of the pipe if necessary to clear supports or other obstructions.

Still another object of the invention is to provide simple quickly-adjustable means for increasing or decreasing the pressure exerted by the locking means.

A still further object of the invention is to provide a pipe coupling having a double bell-and-spigot arrangement, wherein a member carried by one pipe section serves both as a bell for receiving the spigot portion of the companion pipe section, and also as a spigot for cooperation with a bell member carried by said companion pipe section, there being a resilient sealing or packing member associated with the last mentioned bell and spigot and protected by the flange of the bell, whereby the sealing arrangement is capable of withstanding a very high degree of internal pipe pressure.

With the above and other objects in view, which will appear as the description proceeds, the invention consists in the novel details of construction, and combinations and arrangements of parts, more fully hereinafter described, and particularly pointed out in the appended claims.

Referring to the accompanying drawing forming a part of this specification in which like reference characters designate like parts in all the views:—

Figure 1 is a side elevational view, partly broken away, of a quick-detachable coupling constructed in accordance with the present invention, the parts being shown in the connected or coupled positions;

Fig. 2 is a view similar to Fig. 1, the parts being shown however, in the uncoupled positions;

Fig. 3 is a transverse sectional elevational view, taken approximately on the plane indicated by the line 3—3 of Fig. 1 looking in the direction of the arrows; and Fig. 4 is a similar cross sectional view, taken on the plane indicated by the line 4—4 of Fig. 2.

Referring more particularly to the drawing, there is shown a pair of pipe sections 10 and 11, the former of which has rigidly secured to it at one end, by welding or any other suitable means, a ring member 12 which as will be clear from Figures 1 and 2 projects somewhat beyond the end of the section to constitute a bell which is adapted to receive the extreme end of the other section 11 in the manner illustrated in Figure 1. The interior of the projecting portion of the bell member 12 may be slightly tapered as indicated at 13 to facilitate the entry of the end portion of section 11, even though it may be somewhat out of absolute axial alinement with section 10, and the forward face of the said projecting portion is preferably roughened as by the provision of a plurality of concentric grooves 14.

The pipe section 11 also has secured to it by welding or otherwise, a ring member 15 which is spaced inwardly somewhat from the extreme end of the section. The forward face of this ring member is provided with an annular recess 16 which is adapted to align with the projecting portion of the bell member 12 when the parts are assembled. The said recess is provided with an inclined rear wall 17 which is preferably roughened as by a plurality of circumferential grooves or steps 18. The recess 16 also is so formed as to provide an outer annular flange or lip 19 which may, when the parts are assembled, overlap the forwardly projecting portion of the bell 12. A packing ring 20 of rubber or other suitable yielding packing material is positioned within the recess 16. Being of yielding material the said packing accommodates itself to the grooves 14 and 18 which serve to reduce the tendency of the packing to blow out under the influence of pressure from within the pipe sections and this tendency is also further prevented by the lip or flange 19 which overlies the outer periphery of the packing ring when the parts are in assembled condition, as will be readily understood from Figure 1. It will be noted from this figure that in the connected positions, the packing ring 20 is protected against bulging outwardly on all four sides.

For maintaining the bell members 12 and 15 in operative relationship while at the same time permitting of the quick-detachability of the coupling clamping means are provided which are capable of operative engagement with the two bell members, irrespective of the relative circumferential positions these members may occupy one to the other and irrespective of the circumferential position the clamping means may occupy relative to the bell members. As here shown, these means comprise a collar 25 which is freely mounted upon the pipe section 10 for both longitudinal and circumferential movement thereon. The said collar is provided with oppositely disposed pairs of ears 26 and 27 to which are pivotally secured as by the pins 28 and 29 the pairs of links 30 and 31. Clamping arms or levers 32 and 33 are pivotally secured to the other ends of the links 30 and 31 respectively by the pins 34 and 35. The levers 32 and 33 are preferably provided with the lugs or projections 36 and 37 respectively, arranged to engage with the outer surface of the pipe section 11 and act as stops to limit the movement of the levers in the clamping direction. The said levers are provided with extensions 38 and 39 respectively, having heads 40 and 41 which are adapted to be received in an annular groove 42 provided in the rear face of the bell member 15. Inasmuch as the collar 25 is freely movable circumferentially upon the pipe section 10 when the parts are uncoupled and since the heads 40 and 41 of the levers 32 and 33 may be received within the groove 42 at any circumferential point, it is obvious that the parts may be coupled together in any circumferential position any of them may assume. It is thus possible to easily position the levers 32 and 33 and links 30 and 31 to clear any supports or other obstructions which may be encountered as the conduit is being assembled. The links 30 and 31, and the levers 32 and 33 are preferably so designed and constructed as to have sufficient reach to be able to draw the pipes together, even when they are comparatively widely separated.

In order that the clamping force exerted by the levers 32 and 33 on the bell members 12 and 15 may be varied, the collar 25 is preferably provided with suitable adjustable means whereby its longitudinal position relative to the bell members may be changed at will. As here shown these adjusting means comprise set screws 51 threaded into nuts 52 positioned in recesses 53 formed in lugs 54 provided at opposite sides of the collar and preferably at right angles to the ears 26 and 27. The said set screws may be provided with lock nuts 55 for securely locking them in any adjusted positions.

The links 30 and 31 and the clamping levers 32 and 33 are preferably so designed and constructed that when the levers are in the clamping positions illustrated in Figure 1, the heads 40 and 41 are beyond the center lines passing respectively through the pins 28 and 34, and 29 and 35, so that a toggle locking action is had which will prevent the levers from being unintentionally moved to unlocking position.

It will be noted that the inner ends of the set screws 51 bear against the ring member 12 at points which are circumferentially spaced approximately 90° from the points of engagement of the lever heads 40 and 41 with the ring member 15. This, coupled with the use of the resilient packing material 20, and the taper 13 within the ring member 12, provides a certain amount of flexibility in the joint, and renders it self-aligning, without sacrificing any of its other inherent advantages, as will be readily understood.

It will also be obvious that the adjustable set screws 51 provide a simple and effective means for tightening the joint while in use. That is to say, should the joint start to leak in the course of a concrete placement operation, for example, wherein it would be highly inconvenient and undesirable to break the joint for the replacement of a packing ring 20, it is only necessary to take up on the set screws 51, and thereby force the member 12 more firmly toward the member 15 and against the packing 20, thereby stopping leakage until the placement operation has been completed.

While one form of the invention has been illustrated and described, it is obvious that those skilled in the art may vary the precise details of construction and arrangement of parts without departing from the spirit of the invention and therefore it is not wished to be limited to the above disclosure except as may be required by the claims.

What is claimed is:

1. A quick-detachable coupling for high pressure plastic concrete transportation conduits, comprising a relatively short bell member carried by and projecting beyond the end of one pipe section, having a tapered opening arranged to receive within it the straight end of a companion pipe section, the forward face of said bell member being grooved; a second bell member carried by said companion pipe section adjacent said end thereof, having an annular recess facing and in alinement with the projecting portion of said first bell member, said recess having an inclined grooved back wall, and providing an outer annular flange; packing material in said recess, arranged to be compressed between the inclined grooved back wall thereof and the grooved forward face of said first bell member when said members are forced together; the annular flange of said second bell member serving to limit outward radial expansion of said packing; and means for drawing and clamping said bell members together.

2. In a quick-detachable coupling for the complementary pipe sections of high pressure plastic concrete transportation conduits, said sections being provided at their ends with enlarged coacting flange members, a collar mounted upon one of said pipe sections for free longitudinal and circumferential movement, whereby it may be moved to and from the flange member of said section, and coact with said flange in any circumferential position; clamping levers pivotally connected to said collar, having portions arranged to engage behind the coacting flange member of an adjacent pipe section, whereby the said flanges may be drawn and clamped together; and means carried by said collar arranged to control its longitudinal position relative to its companion flange, whereby the force exerted to clamp the flanges together may be varied.

3. In a quick-detachable coupling for the complementary pipe sections of high pressure plastic concrete transportation conduits, said sections being provided at their ends with enlarged coacting bell and spigot flange members, a collar mounted upon one of said pipe sections for free longitudinal and circumferential movement, whereby it may be moved to and from the flange member of said section, and coact with said flange in any circumferential position; clamping levers pivotally connected to said collar at diametrically opposite points, having portions arranged for engagement with the complementary flange member of an adjacent pipe section, whereby the said flanges may be drawn and clamped together; and adjustable members carried by said collar at points intermediate said levers, engageable with its companion flange member to vary the longitudinal position of said collar relative to said flange, whereby the force clamping the flanges together may be varied.

4. In a quick-detachable coupling for the complementary pipe sections of high pressure plastic concrete transportation conduits, said sections being provided at their ends with enlarged coacting flange members, an annular collar mounted upon one of said pipe sections for free longitudinal and circumferential movement, whereby it may be moved to and from the flange member of said section, and coact with said flange in any circumferential position; clamping levers and links pivotally connected to said collar at diametrically opposite points, said levers having portions arranged to engage behind the complementary flange member of an adjacent pipe section, whereby the said flanges may be drawn and clamped together; and set screws threaded in said collar at points intermediate said links and levers, and engageable with the companion flange member at points spaced substantially 90° from the points of engagement between said levers and the complementary flange, said set screws serving to control the axial position of said collar relative to its companion flange, whereby the force clamping the two flanges together may be varied.

CHARLES F. BALL.